2,913,313
PROCESS FOR MANUFACTURING GREEN SILICON CARBIDE

Franz Schroll, Kottern-Neudorf, Germany, assignor to Elektroschmelzwerk Kempten G.m.b.H., Munich, Germany, a corporation No Drawing. Application July 10, 1956
Serial No. 596,847

3 Claims. (Cl. 23—208)

This invention relates to the production of green silicon carbide, and it has for its object to provide a novel and improved process for this purpose.

Another object of the invention is to provide a simple and economical process for producing green silicon carbide from ordinary commercial carbon and sand instead of from expensive specially selected carbon and sand of exceptional purity.

Silicon carbide is made by heating a mixture of carbon and sand in an electric furnace: $SiO_2 + 3C \rightarrow SiC - 2CO$. The structure of silicon carbide is similar to that of diamond, with carbon and silicon atoms alternating; each carbon atom is surrounded by a tetrahedron of silicon atoms, and each silicon atom by a tetrahedron of carbon atoms. The covalent bonds connecting all of the atoms in this structure make silicon carbide very hard (hardness on the Mohs' scale about 9½) and the substance is widely used as an abrasive.

Green silicon carbide, which is preferred for certain purposes, is considered a quality item and signifies a higher intrinsic value. As is known, its successful production is possible only under certain given conditions. First of all, it is necessary to use pure raw materials, but these are expensive and they considerably increase the cost of the final product. The necessary pure sand occurs only in a few available deposits, so that high freight rates must often be paid to obtain it. Furthermore, coke having the required purity is more expensive than the kind ordinarily available.

I have now discovered a process for manufacturing green silicon carbide simply and economically without having to pay attention to special purity of the raw ingredients. My process for producing green silicon carbide consists fundamentally in this, that during the reaction the conversion mixture of ordinary commercially available carbon (coke) and sand is brought in contact with chlorine or with liquids or gaseous compounds which contain such. Probably the effect of my process is to drive out of the reaction mixture certain ingredients or admixtures which otherwise prevent the formation of green crystals.

In the simplest embodiment of the invention, a heat resistant pipe or conduit is arranged to lead into the interior, preferably the center, of the conversion mixture, and through this the gases, vapors and liquid substances referred to above are introduced. As suitable chlorine-containing compounds may be mentioned chlorinated hydrocarbons such as trichlorethylene, carbon tetrachloride and tetrachlorethane, chlorine-silicon compounds, hydrochloric acid, vapor or gaseous ammonium chloride, organic bases and the like. Liquid substances are preferably converted into vapor and then brought into contact with the reaction mixture. It may be preferable to provide the liquid compounds with admixtures which facilitate their conveyance into the reaction mixture and/or lower their volatility, for example high boiling point oil, bitumen, and the like.

Example 1

In an ordinary silicon carbide furnace of 1 cu. meter capacity, containing an intimate mixture of commercially available 1000 kg. sand and 660 kg. coke in the usual reaction proportions, a heat resistant pipe leads from the outside into the interior, preferably into the center of the reaction mixture. During the conversion at a temperature of 1700–2300° 5 kg. of chlorine are introduced through said pipe into the reaction mixture over a period of 8 hours. Upon termination of the conversion a green silicon carbide of excellent quality is obtained.

Example 2

In the same furnace containing the same ordinary reaction mixture mentioned above, two pipes are arranged leading in opposite directions from the outside into the center of the furnace. During the conversion 2.7 kg. of hydrochloric acid is introduced through each pipe within 8 hours. In this manner practically only green silicon carbide is obtained.

Example 3

Into the same silicon carbide furnace containing the reaction mixture as in Examples 1 and 2, 6 kg. of a liquid chlorinated hydrocarbon, such as trichlorethylene, is introduced during the production of the silicon carbide which takes 8 hours; if necessary with the application of a small quantity of a driving or circulating gas, such as nitrogen, introduced by blowing. The product is green silicon carbide.

The invention claimed is:

1. Process for producing green silicon carbide from a mixture of ordinary commercially available sand and coke which comprises reacting said mixture in the proportions of about 1000 kg. sand and 660 kg. coke at a temperature of 1700–2300° C. for a period of about 8 hours, and subjecting said reaction mixture to the action of chlorine throughout the period of conversion.

2. Process according to claim 1, in which the chlorine is introduced through a conduit into the center of the reaction mixture.

3. Process according to claim 2, in which the chlorine is mixed with a conveying substance which facilitates its passage through said conduit and is selected from the group consisting of inert gases, high boiling point oil and bitumen.

References Cited in the file of this patent

UNITED STATES PATENTS

| | | |
|---|---|---|
| 821,017 | Clark | May 22, 1906 |
| 866,444 | Egby | Sept. 17, 1907 |
| 949,386 | Tone | Feb. 15, 1910 |
| 2,018,133 | Kirchner | Oct. 22, 1935 |
| 2,614,946 | Proudfoot | Oct. 21, 1952 |

OTHER REFERENCES

Martin: J. Chem. Soc., vol. 105, page 2836 (1914).